(12) United States Patent
Roussy

(10) Patent No.: US 10,071,840 B2
(45) Date of Patent: Sep. 11, 2018

(54) CAP FOR CLOSING THE NECK FINISH OF A CONTAINER AND METHOD FOR MANUFACTURING SAID CAP

(71) Applicant: SOCIETE ANONYME DES EAUX MINERALES D'EVIAN, Evian-les-Bains (FR)

(72) Inventor: Michel Roussy, Lugrin (FR)

(73) Assignee: SOCIETE ANONYME DES EAUX MINERALES D'EVIAN, "S.A.E.M.E", Évian-les-Bains (FR)

( * ) Notice: Subject to any disclaimer, the term of this patent is extended or adjusted under 35 U.S.C. 154(b) by 0 days.

(21) Appl. No.: 15/109,089

(22) PCT Filed: Dec. 31, 2014

(86) PCT No.: PCT/EP2014/079494
§ 371 (c)(1),
(2) Date: Jun. 29, 2016

(87) PCT Pub. No.: WO2015/101649
PCT Pub. Date: Jul. 9, 2015

(65) Prior Publication Data
US 2016/0325894 A1    Nov. 10, 2016

(30) Foreign Application Priority Data

Dec. 31, 2013 (WO) ................ PCT/FR2013/053295

(51) Int. Cl.
*B65D 51/24*     (2006.01)
*B29C 43/02*     (2006.01)
(Continued)

(52) U.S. Cl.
CPC .......... *B65D 51/245* (2013.01); *B29C 43/021* (2013.01); *B29C 69/02* (2013.01);
(Continued)

(58) Field of Classification Search
CPC .. B65D 51/245; B65D 41/045; B29C 43/021; B29C 69/02; B29K 2023/065; B29L 2031/565
(Continued)

(56) References Cited

U.S. PATENT DOCUMENTS 3,421,653 A * 1/1969 Whaley .............. B65D 43/0208
                                                    215/230
4,389,802 A * 6/1983 McLaren ............. B65D 51/245
                                                    215/230
(Continued)

OTHER PUBLICATIONS

International Search Report and Written Opinion issued in International Patent Application No. PCT/EP2014/079494 dated Feb. 19, 2015.

*Primary Examiner* — J. Gregory Pickett
*Assistant Examiner* — Niki M Eloshway
(74) *Attorney, Agent, or Firm* — Arent Fox LLP

(57) ABSTRACT

The invention relates to a cap for closing the neck finish of a container—preferably a bottle—suitable for containing water or other liquids for human consumption (generically drinking water hereafter).
For improving the possibilities of decoration/of marking the cap, this latter comprises:
  a top wall (2);
  an annular skirt (3) extending downward from the top wall (2) and having a bottom edge (4);
  reversible opening/closing means (5) of the cap (1) on the neck finish of the container, said means (5) being preferably screw thread means (5) located inside the cap (1), and more preferably on the inner face of the skirt (3);
  at least one decoration element (7);
wherein:
  i. the top wall (2) is dug out with at least one dimple (5), preferably one dimple (5), more preferably a circular dimple (5);

(Continued)

ii. at least one insert (6), preferably one (over)-molded insert (6), more preferably a disc (6), is designed to fill at least partially the dimple (5);
iii. at least one decoration element (7) is integral with the bottom of the dimple (5) and/or the disc (6);

said cap (1) having a body (8) corresponding to the cap (1) except the insert (6).

17 Claims, 4 Drawing Sheets

(51) Int. Cl.
    *B29C 69/02*     (2006.01)
    *B65D 41/04*     (2006.01)
    *B65D 55/00*     (2006.01)
    *B29K 23/00*     (2006.01)
    *B29L 31/56*     (2006.01)

(52) U.S. Cl.
    CPC ...... B65D 41/045 (2013.01); *B29K 2023/065* (2013.01); *B29L 2031/565* (2013.01)

(58) Field of Classification Search
    USPC .................................................. 215/230, 203
    See application file for complete search history.

(56) References Cited

U.S. PATENT DOCUMENTS

| | | | | |
|---|---|---|---|---|
| 4,872,570 | A * | 10/1989 | Harding | B65D 55/066 116/307 |
| 5,092,477 | A * | 3/1992 | Johnson, Jr. | B65D 55/066 215/220 |
| 5,189,531 | A * | 2/1993 | Palmer | A45D 33/18 132/293 |
| 5,285,238 | A * | 2/1994 | Quadracci | G03B 35/14 355/22 |
| 5,497,879 | A * | 3/1996 | Kao | B65D 43/0218 206/389 |
| 6,065,623 | A | 5/2000 | Hierzer et al. | |
| 6,394,293 | B1 | 5/2002 | Hierzer et al. | |
| 2006/0186081 | A1 * | 8/2006 | Reed | B65D 41/0464 215/350 |
| 2007/0199913 | A1 | 8/2007 | Kelley et al. | |
| 2008/0257850 | A1 * | 10/2008 | O'Keefe-Broadbent | B65D 43/0231 215/230 |
| 2010/0072163 | A1 * | 3/2010 | Krause | B65D 41/0414 215/230 |

* cited by examiner

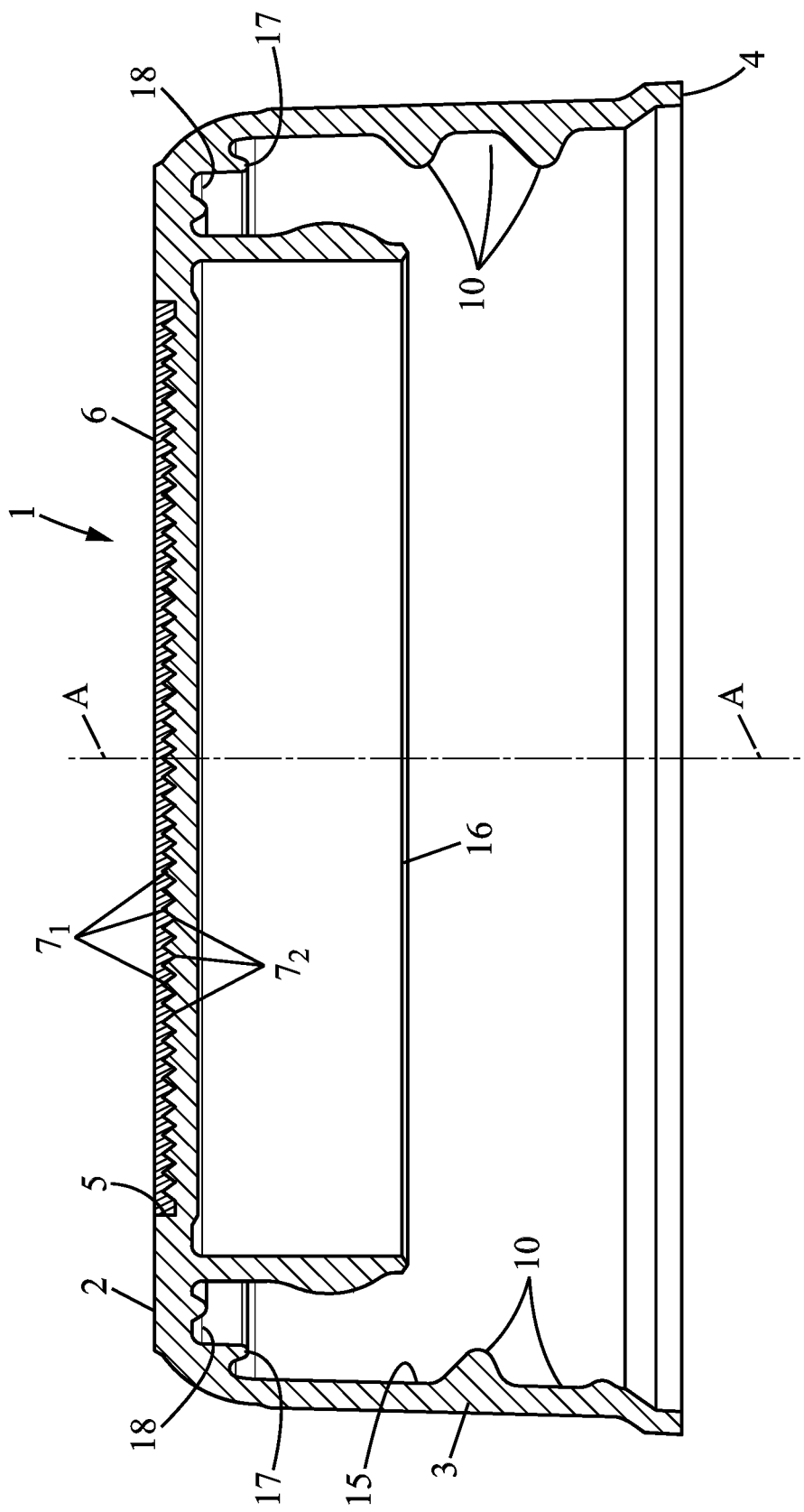

CAP FOR CLOSING THE NECK FINISH OF A CONTAINER AND METHOD FOR MANUFACTURING SAID CAP

CROSS REFERENCE TO RELATED APPLICATION

This application is a 35 U.S.C. 371 National Phase of PCT Application No. PCT/EP2014/079494 filed Dec. 31, 2014, which claims priority to PCT Application No. PCT/FR2013/053295 filed Dec. 31, 2013, the disclosure of which is hereby incorporated in by reference in its entirety.

FIELD OF THE INVENTION

The invention relates to a cap for closing the neck finish of a container—preferably a bottle—suitable for containing water or other liquids for human consumption (generically drinking water hereafter).

The container closed with said cap as well as the method for manufacturing said cap, are encompassed in the present invention.

More particularly, the invention pertains to the decoration of such caps which can be obtained by moulding synthetic materials.

BACKGROUND

To improve the communication towards the consumers, the molded caps for bottles have to be decorated (logos-printings).

Such a decoration has to be simple and economical with respect to the manufacture of the caps. In the same time, this decoration should contribute to the tamper-proofing of the container.

The decoration should also resist to impacts and abrasions, during the shelf-life of the caps.

And of course, the decoration must be distinctive and attractive for the consumers.

OBJECTIVES OF THE INVENTION

The invention aims at fulfilling at least one of the above specifications.

The invention aims at providing an improved cheap and well-decorated molded container (e.g. bottle) cap.

SUMMARY OF THE INVENTION

The invention aims at solving the above mentioned problems.

To this end, according to a first aspect, the invention provides a cap for closing the neck finish of a container—preferably a bottle—, which presents an axial symmetry of revolution with respect to its axis (A), which is substantially annular, and which comprises:
  a top wall;
  an annular skirt extending downward from the top wall and having a bottom edge;
  reversible opening/closing means of the cap on the neck finish of the container;
  said means being preferably screw thread means located inside the cap, and more preferably on the inner face of the skirt;
  means for fixing the cap on the neck finish of the container, said means being located inside the cap on the inner face of the skirt;
  at least one decoration element;

wherein:
  i. the top wall is dug out with at least one dimple, preferably one dimple, more preferably a circular dimple;
  ii. at least one insert, preferably one (over)-molded insert, more preferably a disc, is designed to fill at least partially the dimple;
  iii. at least one decoration element is integral with the bottom of the dimple and/or the disc;
    said cap having a body corresponding to the cap except the insert.

This peculiar structure improves the decoration of the cap and also complicates the copy for the counterfeiters.

According to a remarkable possibility, the decoration element is viewable as the cap is in the closed position on to the neck finish of the container, as well as the cap is in the open position removed from the neck finish of the container.

Preferably, the decoration element is not a lithophane image that is viewable only upon opening of the cap from the neck finish of the container.

Advantageously, the body of the cap is obtained by molding, preferably compression molding, of at least one thermoplastic material.

Said thermoplastic material is, for instance, a thermoplastic polyolefin, preferably selected in the group comprising—especially composed of—a High Density PolyEthylene (HDPE), a Low Density PolyEthylene (LDPE), a Linear Low Density PolyEthylene (LLDPE), a polypropylene (PP) or a EthylVinylAcetate (EVA), and mixtures and/or alloys thereof.

Advantageously, the body is coloured with at least one colour and/or transparent or translucent.

According to a preferred embodiment, the insert is obtained by compression molding, of at least one thermoplastic material in the dimple of the top wall.

According to a particular feature of the invention, the thermoplastic material of the insert is the same as the body or a different one.

Said thermoplastic material of the insert e.g. is a Thermo-Plastic-Elastomer (TPE) or a ThermoPlastic POlyolefin (TPPO) preferably selected in the group comprising—especially composed of—a High Density PolyEthylene (HDPE), a Low Density PolyEthylene (LDPE), a Linear Low Density PolyEthylene (LLDPE), a polypropylene (PP) or a EthylVinylAcetate (EVA), and mixtures and/or alloys thereof, or a mixture and/or an alloy of at least a TPE and/or of at least one TPPO; the thermoplastic material of the insert (6) being preferably a TPE.

According to a possibility, the insert is coloured with at least one colour different from the colour of the body.

According to another possibility, the insert is transparent or translucent.

According to another possibility, the insert is opaque, and the decoration element is integral with the insert.

According to another possibility, the insert is polished or non polished.

It is a peculiarity of the invention that the decoration element comprises at least one pattern, preferably at least one graphic pattern.

According to a noteworthy feature of the invention, said pattern is printed or engraved in positive or negative on the bottom of the dimple or on the insert.

Outstandingly, the insert does substantially not stick over the upper face of the top wall.

The thickness of the insert/disc (e.g. 0.2-0.3 mm) corresponds substantially to the deepness of the dimple.

In a possibility, the insert/disc can be thinner than the deepness of the dimple, when the pattern forming the decoration element is an embossed design onto the insert/disc, in order that said embossed pattern does not stick over the top wall.

According to a second aspect, the invention concerns a container—preferably a bottle—closed by a cap as above defined.

Said container sealed with the cap, is preferably filled with a liquid, preferably a beverage, for example water, still or sparkling energy drinks or carbonated drinks such as sodas or colas.

According to a third aspect, the invention concerns a method for manufacturing, by compression molding, a cap according to the invention as above described, comprising the following steps:
  molding the body with the dimple;
  printing or engraving the decoration element in the dimple and/or on the disc;
  overmolding the insert in the dimple.

Definitions

According to the terminology of this text, the following non limitative definitions have to be taken into consideration:
  Every singular designates a plural and reciprocally.
  "container" refers to any container for liquids, especially beverages like water: bottles, jugs, fountains, barrels, of different volumes e.g.: 0.20 L; 1.0 L; 2.0 L; 5.0 L; 11 L; 18.9 L; containers of larger volumes being adapted for beverage dispensers (Home & Office Delivery HOD).
  "thermoplastic" refers to mouldable thermoplastic homopolymer or copolymer that becomes pliable or moldable above a specific temperature, and returns to a solid state upon cooling.
  "moulded" refers to any forming technique of thermoplastic raw materials, such as extrusion blow moulding, extrusion profiles & sheet, injection blow moulding, injection moulding injection moulding (gas assisted), injection stretch blow moulding insert moulding, rotational moulding, compression moulding.

DETAILED DESCRIPTION OF THE INVENTION

Other objects and advantages of the invention will emerge from the following disclosure of particular embodiments of a cap which constitutes a first aspect of the invention. These embodiments are given as non limitative examples. The following disclosure is made in reference to the enclosed drawings in which:

FIG. 6 is a diametral section of a ninth embodiment of the cap according to the invention.

Figure 2:
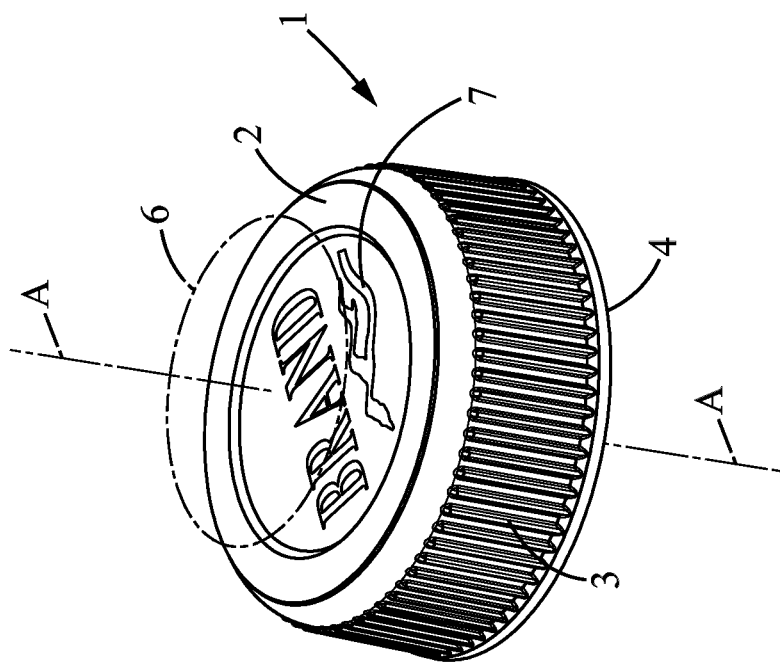
FIG. 2 is a top perspective view of a second embodiment of the cap according to the invention.

On these drawings, the followings elements are designated by the following references:

cap (1);
axis (A);
top wall (2);
annular skirt (3) having a bottom edge (4);
circular dimple or recess (5);
disc (6);
decoration element (7);
body (8) of the cap (1);
reversible opening/closing means (10) of the cap (1) on the neck finish of the container, said means (10) being screw thread means located on the inner face (15) of the skirt (3) [FIG. 6].

Figure 1:
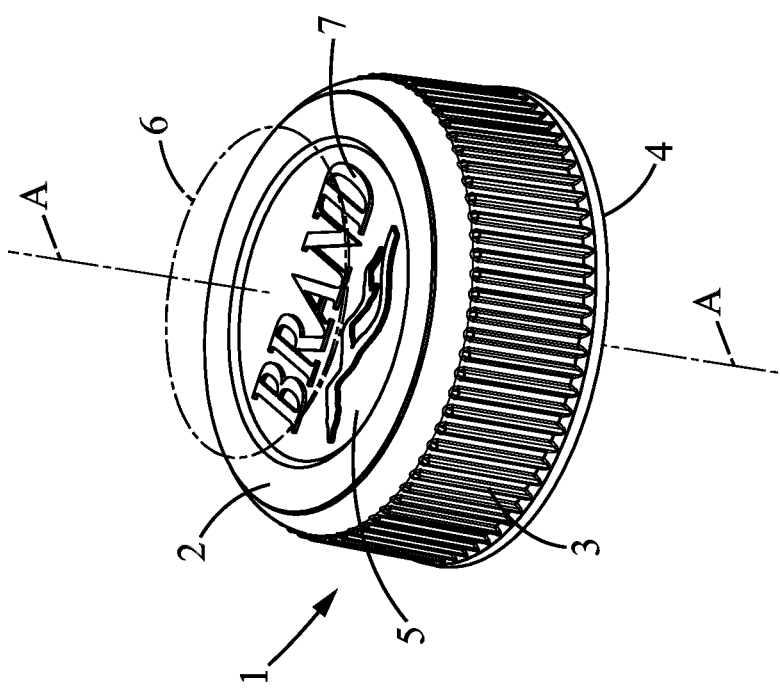
FIG. 1 is a top perspective view of a first embodiment of the cap according to the invention.

In the first embodiment of FIG. 1:
the body (8) is monochrome (e.g. blue);
the pattern of the decoration element (7) is engraved on the bottom of the recess (5);
the colour of the decoration element (7) is identical to the colour of body (8);
the insert/disc (6) is transparent and non polished.

In the second embodiment of FIG. 2:
the body (8) is monochrome (e.g. blue);
the pattern of the decoration element (7) is engraved on the bottom of the recess 5;
the colour of the decoration element (7) is different from the colour of body (8) (e.g. green);
the insert/disc (6) is transparent and non polished.

Figure 3:
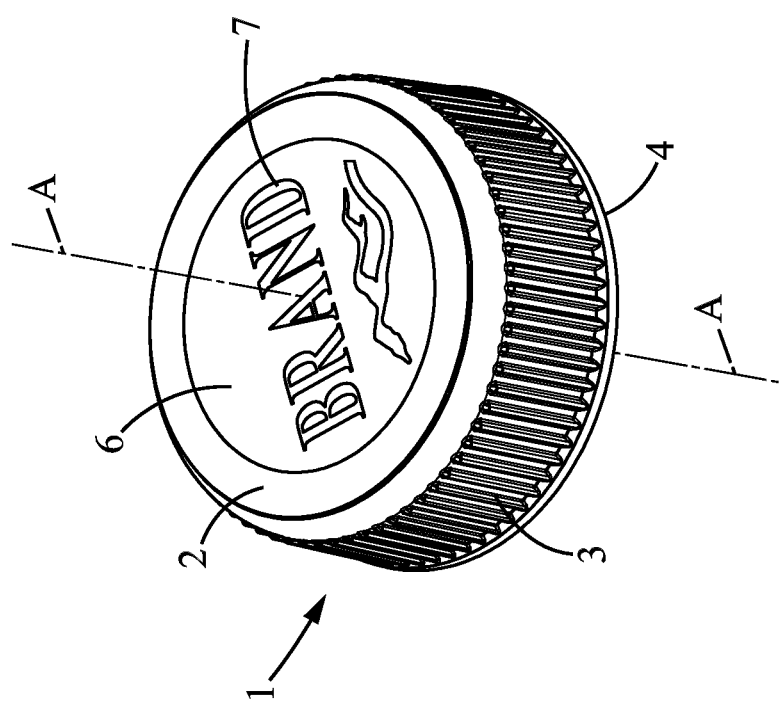
FIG. 3 is a top perspective view of a third embodiment of the cap according to the invention.

In the third embodiment of FIG. 3:
the body (8) is monochrome (e.g. white);
the pattern of the decoration element (7) is of a colour (e.g. blue) different from the body (8);
the pattern of the decoration element (7) is engraved on the insert/disc (6);
the insert/disc (6) is of a third colour (e.g. green) different from the ones of the body (8) and of the pattern.

Figure 4:
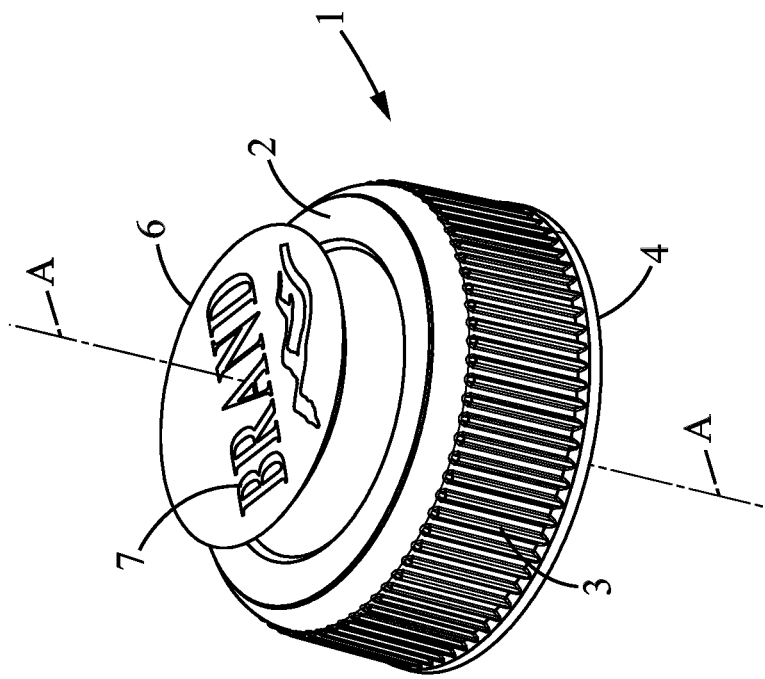
FIG. 4 is a top perspective view of a fourth embodiment of the cap according to the invention.

In the fourth embodiment of FIG. 4:
the body (8) is monochrome (e.g. blue);
the pattern of the decoration element (7) is of a colour (e.g. white) different from the body (8);
the pattern of the decoration element (7) is engraved on the insert/disc (6), which is transparent and non polished.

Figure 5:
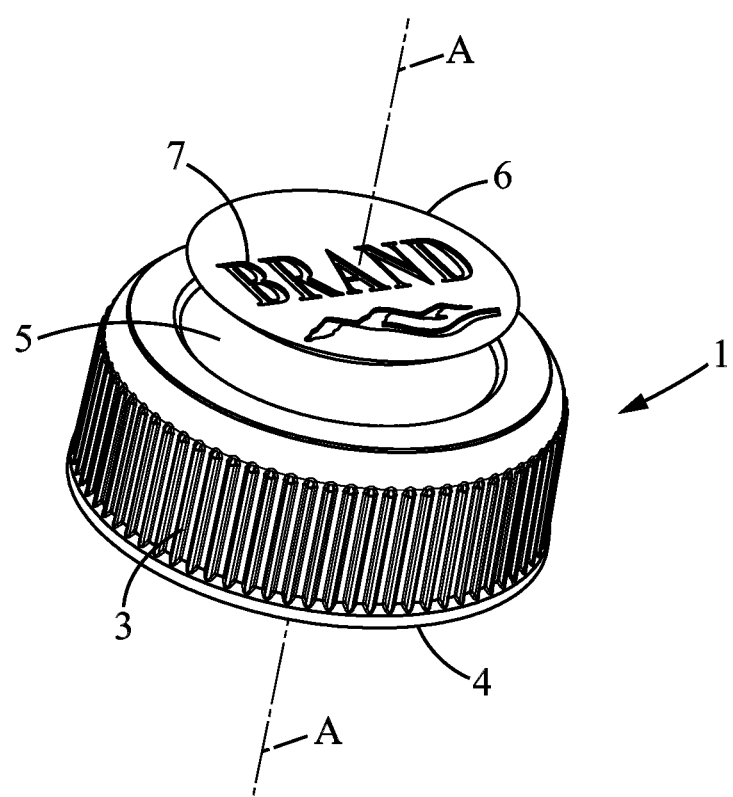
FIG. 5 is a top perspective view of a fifth embodiment of the cap according to the invention.

In the fifth embodiment of FIG. 5:
the body is monochrome (e.g. blue);
the pattern of the decoration element (7) is engraved on the insert/disc (6);
the insert/disc (6) is monochrome (e.g. white).

The following table sums up these 5 embodiments and further embodiments of the invention.

| Embodiment Nr. | FIG. | Body (8) | Between Body (8) and Disc (6) | Disc | Pattern on top face of the disc |
|---|---|---|---|---|---|
| 1 | 1 | HDPE color A (blue) | Engraving color A (blue) | TPE transparent | |
| 2 | 2 | HDPE color A (blue) | Digital printing Color B (green) | TPE transparent | |
| 3 | 3 | HDPE color A (white) | | HDPE color B (green) | Digital printing Color C (blue) |
| 4 | 4 | HDPE color A (blue) | | TPE transparent | Digital printing Color B (white) |

| Embodiment Nr. | FIG. | Body (8) | Between Body (8) and Disc (6) | Disc | Pattern on top face of the disc |
|---|---|---|---|---|---|
| 5 | 5 | HDPE color A (blue) | | HDPE color B (white) | Engraving color B (white) |
| 6 | | HDPE color A | Digital printing | TPE transparent | Engraving transparent |
| 7 | | HDPE color A | Digital printing | TPE transparent | Digital printing |
| 8 | | HDPE color A | Engraving color A | TPE transparent | Digital printing |
| 9 | 6 | HDPE color A | Engraving (7) on the bottom of the recess (5) | HDPE color B (green) | |

In the ninth embodiment of FIG. 6:
the body (8) is monochrome (e.g. blue);
the insert/disc (6) is monochrome of a colour (e.g. green) different from the body (8);
the pattern of the decoration element (7) is engraved on the bottom of the recess (5).

The engraving (7) comprises for instance peaks ($7_1$) and holes ($7_2$). As shown on the FIG. 6, the cap (1) may include a sealing groove (18), which is, for example, defined by an internal annular rib (16) and an external rib (17), both extending from the lower face of the top wall (2). Said sealing groove (18) is intended to receive the end of the neck finish of the container. Of course, the presence of a sealing groove (18) is not exclusive of the $9^{th}$ embodiment of the cap according to the invention.

Advantageously, the pattern (7) can be visible by transparency through the disc (6), as shown in the embodiments of FIGS. 1, 2 & 6.

The cap (1) according to the invention can further comprise a plurality of ribs extending parallel to the central axis on the outer surface of the skirt.

In a variant, the cap (1) according to the invention can include means for fixing said cap (1) on the neck finish of the container. This fixing is non-reversible with respect to the reversible opening/closing means (5) of the cap (1) on the neck finish of the container. Said non-reversible fixing means are part of a tamper-evident system (tamper-proof ring). They are located inside the cap (1), on the inner face of the skirt (3), close to the bottom (4) of the skirt (3). These means are elements of complementary form with elements placed on the external face of the container's neck finish, said elements being preferably ribs and grooves, more preferably (dis)continuous bead(s) on the inner face of the skirt capable to be fitted into a complementary groove of the container.

Said non-reversible fixing means are integral with a tamper-proof ring band which is the free end of the skirt (3). To provide a tamper-evident system, a slitting, consisting in forming, in a plane perpendicular to the central axis, a weakened portion connecting the bottom tamper-proof ring of the skirt and a remaining top part of the skirt, is performed. The weakened portion can for example be a continuous blind slit or discrete through openings. These slits or openings could be obtained by cutting on the molded cap or by several molded bridges joining the bottom tamper-proof ring to the rest of the skirt. In other embodiments, tamper-evident system of any other suitable type could be implemented.

The cap according to the invention is adapted for any container for liquids, especially beverages like water, optionally flavoured and/or carbonated, a soda, a fruit juice, a milk based liquid product or other.

According to a second aspect, the invention concerns a method for manufacturing, by compression molding, a cap as above defined comprising the steps of:
molding the body with the dimple 5;
printing or engraving the decoration element 7 in the dimple 5 or on the disc 6;
overmolding insert/disc 6 in the dimple 5.

The invention claimed is:
1. A cap which comprises:
a body made of molded thermoplastic material and adapted for closing a neck finish of a container, the body presenting an axial symmetry of revolution with respect to an axis and being annular, the body including a top wall having a upper face provided with at least one dimple, an annular skirt extending downward from the top wall and having a bottom edge, and reversible opening/closing portion of the cap on a neck finish of a container;
at least one insert made of thermoplastic material overmolded to fill the dimple at least partially, the insert being opaque and colored with at least one color different from the color of the body;
wherein at least one decoration element is integrally formed with the insert; the decoration element comprising at least one pattern printed or engraved in positive or negative on the insert,
wherein the decoration element is viewable when the cap is in the closed position on to the neck finish of the container, as well as when the cap is in the open position removed from the neck finish of the container.
2. The cap according to claim 1, wherein the thermoplastic material of the body is a thermoplastic polyolefin.
3. The cap according to claim 2, wherein said thermoplastic polyolefin of the body includes at least one of a High Density PolyEthylene (HDPE), a Low Density PolyEthylene (LDPE), a Linear Low Density PolyEthylene (LLDPE), a polypropylene (PP) or EthylVinylAcetate (EVA), or mixtures thereof.
4. The cap according to claim 1, wherein the body is colored with at least one of a color, transparent and translucent.
5. The cap according to claim 1, wherein the thermoplastic material of the insert comprises a Thermo-Plastic-Elastomer (TPE) or a ThermoPlastic POlyolefin (TPPO) or a mixture of at least a TPE and/or of at least one TPPO.
6. The cap according to claim 5, wherein said TPPO include at least one of a High Density PolyEthylene (HDPE), a Low Density PolyEthylene (LDPE), a Linear Low Density PolyEthylene (LLDPE), a polypropylene (PP), EthylVinylAcetate (EVA), or mixtures thereof.
7. The cap according to claim 1, wherein the insert is polished.
8. The cap according to claim 1, wherein the insert does not substantially stick over the upper face of the top wall.
9. A container closed by the cap according to claim 1.
10. A method for manufacturing, by compression molding, the cap according to claim 1, comprising the following steps:
molding the body with the dimple;
printing or engraving the decoration element in the dimple and/or on a disc; and
overmolding the insert in the dimple.

11. The cap according to claim 1, wherein said reversible opening/closing portion is a screw thread located inside the cap.

12. The cap according to claim 1, wherein said screw thread is located on an inner face of the skirt.

13. The cap according to claim 1, wherein the dimple is circular.

14. The cap according to claim 1, comprising a single overmolded insert.

15. The cap according to claim 1, wherein said insert is a disc.

16. The cap according to claim 1, wherein the insert is non polished.

17. A bottle enclosed by the cap according to claim 1.

* * * * *